United States Patent
Lee

(10) Patent No.: US 11,973,449 B2
(45) Date of Patent: Apr. 30, 2024

(54) MOTOR SYSTEM AND MOTOR CONTROL METHOD

(71) Applicant: Sentelic Corporation, Taipei (TW)

(72) Inventor: Wen-Ting Lee, Taipei (TW)

(73) Assignee: Sentelic Corporation, Taipei (TW)

( * ) Notice: Subject to any disclaimer, the term of this patent is extended or adjusted under 35 U.S.C. 154(b) by 84 days.

(21) Appl. No.: 17/456,564

(22) Filed: Nov. 24, 2021

(65) Prior Publication Data

US 2023/0129213 A1 Apr. 27, 2023

(30) Foreign Application Priority Data

Oct. 21, 2021 (TW) ................................ 110139054

(51) Int. Cl.
  *H02P 27/08* (2006.01)
  *H02M 7/5387* (2007.01)
  *H02M 7/5395* (2006.01)

(52) U.S. Cl.
  CPC ...... *H02P 27/085* (2013.01); *H02M 7/53871* (2013.01); *H02M 7/5395* (2013.01)

(58) Field of Classification Search
  CPC .......... H02P 27/085; H02P 6/00; H02P 9/009; H02P 21/06; H02P 21/12; H02P 25/026; H02M 7/53871; H02M 7/5395
  USPC .................................................... 318/400.09
  See application file for complete search history.

(56) References Cited

U.S. PATENT DOCUMENTS

| | | | |
|---|---|---|---|
| 4,832,576 A | | 5/1989 | Deguchi et al. |
| 9,966,885 B1 * | | 5/2018 | Strong .................... G01R 33/07 |
| 2008/0157754 A1 * | | 7/2008 | Kim ........................ G01R 33/07 |
| | | | 324/207.2 |
| 2011/0176229 A1 * | | 7/2011 | Saito ...................... G02B 7/102 |
| | | | 318/400.13 |
| 2013/0307454 A1 | | 11/2013 | Hioki et al. |
| 2022/0388599 A1 * | | 12/2022 | Lee .......................... B62M 6/65 |

FOREIGN PATENT DOCUMENTS

| | | | |
|---|---|---|---|
| CN | 104779847 A | 7/2015 | |
| CN | 107787549 A | 3/2018 | |
| KR | 101989138 B1 * | 9/2019 | ............... H03H 7/12 |
| TW | I229972 B | 3/2005 | |
| TW | 201206048 A | 2/2012 | |
| TW | 202032901 A | 9/2020 | |

* cited by examiner

Primary Examiner — Bickey Dhakal
(74) Attorney, Agent, or Firm — CKC & Partners Co., LLC

(57) ABSTRACT

A motor system includes a driving circuit, a motor device and a control circuit. The driving circuit outputs a driving current according to multiple control signals. The motor device drives a rotor unit to rotate according to the driving current, and includes a first sensor and a second sensor to sense the polarity of the rotor unit in different directions to generate polarity data. The control circuit receives the polarity data. When the polarity data is in a first state, the control circuit records a first maintenance time. When the polarity data changes from the first state to a second state, and a second maintenance time for the second state corresponds to the first maintenance time, the control circuit sets the polarity data to a third state, until the polarity data is changed from the third state to a fourth state.

20 Claims, 3 Drawing Sheets

MOTOR SYSTEM AND MOTOR CONTROL METHOD

CROSS-REFERENCE TO RELATED APPLICATION

This application claims priority to Taiwan Application Serial Number 110139054, filed Oct. 21, 2021, which is herein incorporated by reference in its entirety.

BACKGROUND

Technical Field

The present disclosure relates to a motor system and a motor control method to detect the rotor position, so as to ensure that the motor operates normally.

Description of Related Art

With the advancement of technology, the operating frequency of various electronic devices has increased, but the increase in operating frequency has caused the internal temperature of the electronic device to increase relatively when operating. In order to prevent high temperature from affecting the operation of the electronic device and avoid damage to the electronic device, the fan system becomes indispensable for the electronic device.

When the fan system is in operation, the operating state of the motor needs to be determined according to the position of the rotor of the motor. Although multiple position sensors can be configured in the fan system to detect the rotor of the motor, the number of sensors affects the size and cost of the motor, which makes design difficult.

SUMMARY

One aspect of the present disclosure is a motor system, comprising a driving circuit, a motor device and a control circuit. The driving circuit comprises a plurality of bridge arm units. The plurality of bridge arm units are electrically coupled to a power source, and control a plurality of switches to be turned on or off according to a plurality of control signals to output a driving current. The motor device is electrically coupled to the driving circuit to drive a rotor unit to rotate according to the driving current. The motor device comprises a first sensor and a second sensor, and the first sensor and the second sensor are configured to sense a polarity of the rotor unit in different directions to generate a polarity data. The control circuit is electrically coupled to the driving circuit and the motor device to receive the polarity data. When the polarity data is in a first state, the control circuit is configured to record a first maintenance time of the first state. When the polarity data changes from the first state to a second state, and a second maintenance time of the second state corresponds to the first maintenance time, the control circuit is configured to set the polarity data to a third state until the polarity data is changed from the third state to a fourth state.

Another aspect of the present disclosure is a motor control method, comprising the following steps: obtaining, by a first sensor and a second sensor, a polarity of a rotor unit of a motor device in different directions to generate a polarity data; recording, by a control circuit, a first maintenance time of the first state when the polarity data is maintained in a first state; when the polarity data changes from the first state to a second state, recording a second maintenance time until the second maintenance time of the second state corresponds to the first maintenance time; when the second maintenance time of the second state corresponds to the first maintenance time, setting the polarity data to a third state until the polarity data is changed from the third state to a fourth state; and generating a driving current according to the polarity data to drive the motor device.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
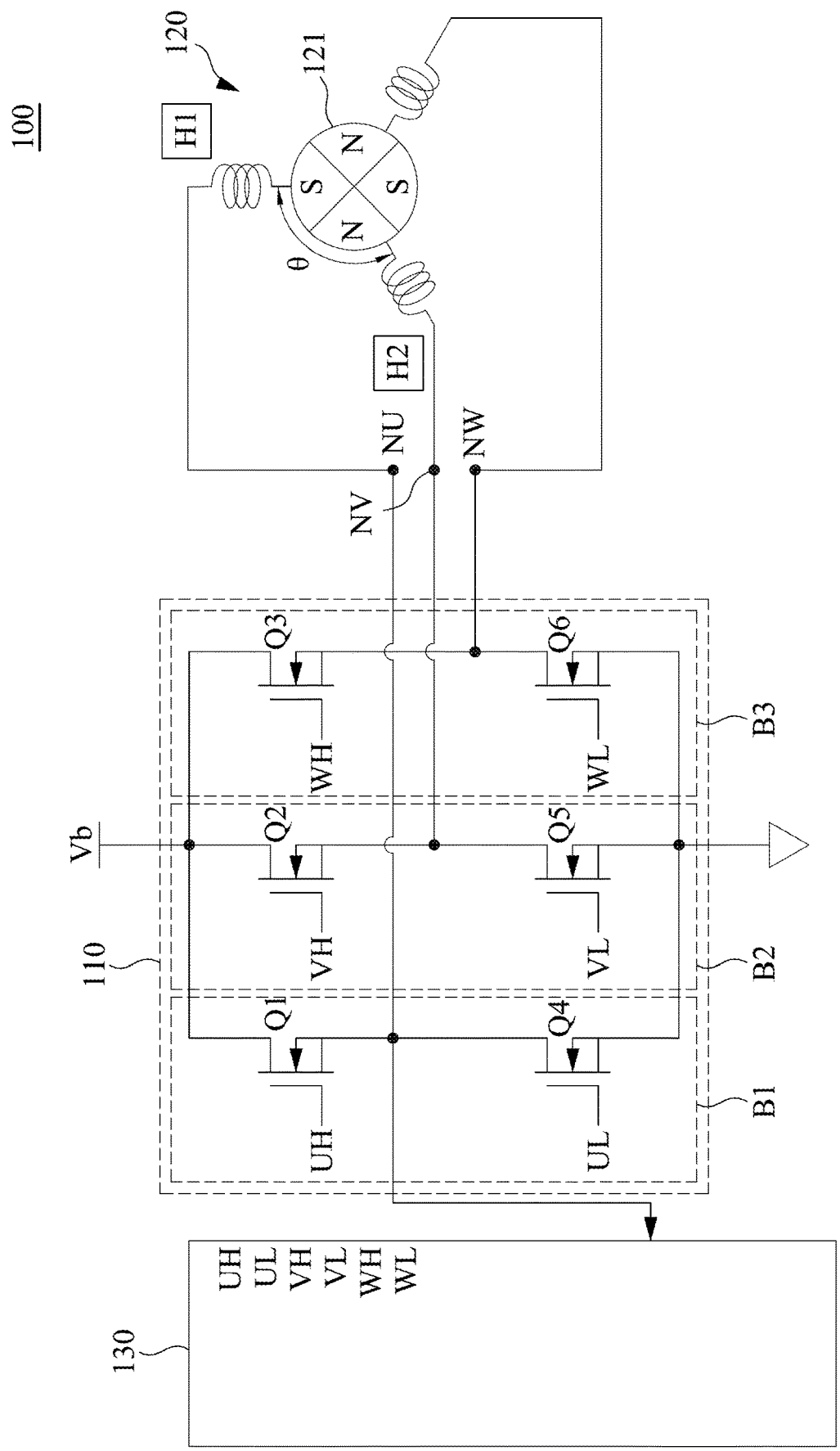
FIG. 1 is a schematic diagram of a motor system in some embodiments of the present disclosure.

FIG. 1 is a schematic diagram of a motor system 100 in some embodiments of the present disclosure. The motor system 100 includes a driving circuit 110, a motor device 120 and a control circuit 130. The driving circuit 110 is electrically coupled to a power source Vb, the motor device 120 and the control circuit 130, and n include multiple switch elements. In one embodiment, the driving circuit 110 receives multiple control signals UH, UL, WH, WL, VH, VL from the control circuit 130, and controls each of the switch elements to be turned on or off according to the control signals UH, UL, WH, WL, VH, VL to output a driving current.

Specifically, the driving circuit 110 includes a three bridge arm units B1-B3. Each of the bridge arm units B1-B3 is electrically coupled to the different three-phase nodes NU, NV, NW, and includes six switches Q1-Q6. The bridge arm units B1-B3 controls the six switches Q1-Q6 to be turned on or off according to the control signals UH, UL, WH, WL, VH, VL, so that the driving circuit 110 outputs the driving current through the three-phase nodes. Since those of ordinary skill in the art understand the operation of the bridge arm units, it will not be repeated.

The motor device 120 is electrically coupled to the driving circuit 110 through the three three-phase nodes NU, NV, NW, so as to drive the rotor unit 121 to rotate according to the driving current. In one embodiment, the motor device 120 is a three-phase motor. That is, three stator windings of the motor device 120 generate magnetic fields according to the driving current to drive the rotor unit 121 to rotate.

In some embodiments, the motor system 100 is applied to a fan system to drive the fan blades of the fan to rotate, but the present disclosure is not limited to this, and the present disclosure can also be applied to other types of devices.

In one embodiment, the rotor unit 121 is a magnet. When the rotor unit 121 rotates, the N pole and S pole of the rotor unit 121 will rotate accordingly. The control circuit 130 need to confirm the rotation position of the rotor unit 121, and the output control signals UH, UL, WH, WL, VH, VL can be configured to precisely control each switch element to be turned on or off, so as to output the driving current.

One method to control a three-phase motor is to configure three sensors in the motor device 120. Each sensor is used to sence/detect the polarity of the rotor unit 121 in different directions. In one embodiment, the sensors H1, H2 are Hall sensors that can sence/detect the polarity facing the sensors H1, H2, and record the detection signals. For example, the N pole is recorded as "1", the S pole is recorded as "0".

As shown in FIG. 1, the sening result of the sensor H1 can be recorded as a digital signal. For example, when the sening direction corresponds to the S pole of the rotor unit 121, the sening digital signal is "0". In contrast, when the sening direction of the sensor H2 corresponds to the N pole of the rotor unit, the sening digital signal is "1". However, since the three sensors require a larger configuration space and also require a higher cost, the present disclosure may only use two sensors H1, H2, and there is no need to configure a third sensor.

The control circuit 130 is electrically coupled to the driving circuit 110 and the motor device 120, and configured to adjust the control signals UH, UL, WH, WL, VH, VL according to the position of the rotor unit 121. In one embodiment, the control signals UH, UL, WH, WL, VH, VL are the pulse width modulation signals.

Specifically, the motor device 120 includes a first sensor H1 and a second sensor H2. The first sensor H1 and the second sensor H2 are configured to sense the polarity of the rotor unit 121 in different directions and records it as a polarity data. The first sensor H1 is configured to sense/obtain a first polarity of the rotor unit 121 in the first direction, and the second sensor H2 is configured to sense/obtain a second polarity of the rotor unit 121 in the second direction. The combination of the first polarity and the second polarity will be recorded as the polarity data. In other words, the polarity of different parts of the rotor unit 121 will be recorded by the sensors H1 and H2 at the corresponding positions.

In this embodiment, positions of the first sensor H1 and the second sensor H2 respectively correspond to a stator winding in the motor device 120, so the arrangement angle θ between the first sensor H1 and the second sensor H2 is at least 120 degrees. In other embodiments, the arrangement angle θ between the first sensor H1 and the second sensor H2 can be adjusted to other values.

The following is a table for using "three sensors (indicated by H1-H3)" to sence the current position of the rotor unit 121. "0" is used to represent the S pole, and "1" is used to represent the N pole. The "code" in the table is the identification code commonly used in the industry, and the number can be changed. For simplicity's sake, the six rotational positions of the rotor unit 121 are respectively set to six states:

| State of the rotor | code | H1 | H2 | H3 |
|---|---|---|---|---|
| the first state | #1 | 0 | 0 | 1 |
| the second state | #5 | 1 | 0 | 1 |
| the third state | #4 | 1 | 0 | 0 |
| the fourth state | #6 | 1 | 1 | 0 |
| the fifth state | #2 | 0 | 1 | 0 |
| the sixth state | #3 | 0 | 1 | 1 |

In the previous table, each state corresponds to a set of polarity data, and also corresponds to the rotation position of the motor device 120 (or "sector"). As mentioned above, since three sensors will cause the motor device 120 to be too large and costly, the present disclosure uses two sensors, and the control circuit 130 stores the following tables:

| State of the rotor | code | H1 | H2 |
|---|---|---|---|
| the first state | #1 | 0 | 0 |
| the second state | #5 | 1 | 0 |
| the third state | #4 | 1 | 0 |
| the fourth state | #6 | 1 | 1 |
| the fifth state | #2 | 0 | 1 |
| the sixth state | #3 | 0 | 1 |

In the foregoing table, the set of polarity sensed by the first sensor H1 and the second sensor H2 is the polarity data. For example, "0, 0" is the first state, and "1, 1" is the fourth state. As shown in the table, when only two sensors are configured, the polarity data in the second state and in the third state are the same (identical). The polarity data in the fifth state and in the sixth state are the same (identical). Therefore, the control circuit 130 needs to confirm which state the rotor currently belongs to through other methods.

Figure 2:
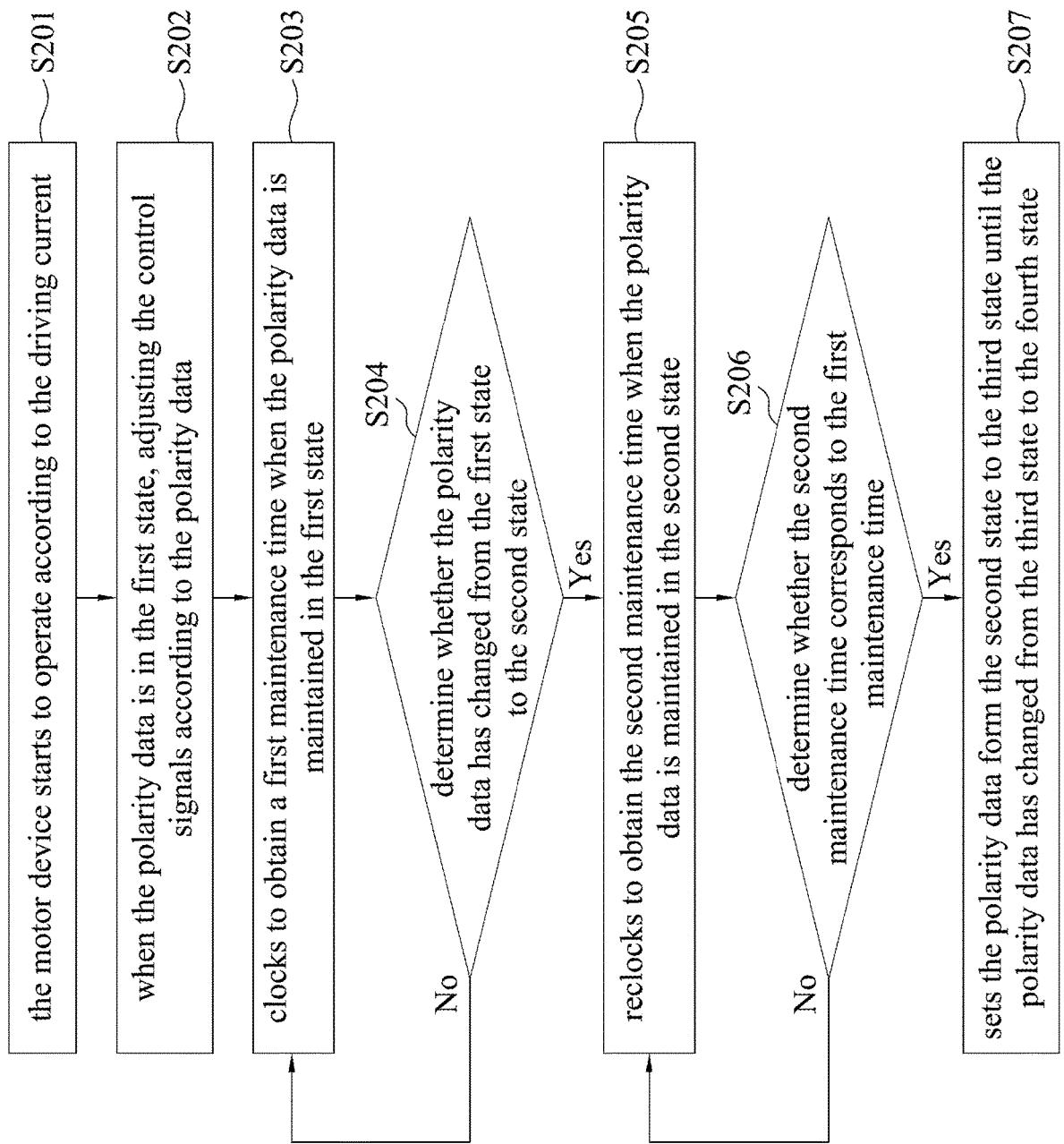
FIG. 2 is a flowchart illustrating a motor control method in some embodiments of the present disclosure.

FIG. 2 is a flowchart illustrating a motor control method in some embodiments of the present disclosure. in step S201, the motor device 120 receives the driving current to be activated from the driving circuit 110, then starts to operate according to the driving current. In step S202, the control circuit 130 receives the polarity senced by first sensor H1 and the second sensor H2, and records the polarity as the polarity data. If the control circuit 130 determines the polarity data is in the first state (e.g., the combination of the first polarity and the second polarity is "0, 0"), the control circuit 130 adjusts the control signals UH, UL, WH, WL, VH, VL according to the polarity data, and transmits the control signals UH, UL, WH, WL, VH, VL to the driving circuit 110.

Steps S201 and S202 are the zeroing (reset) stage of the motor system 100. After the control circuit 130 determines that the rotor unit 121 is in a preset position (i.e., the first state), the control circuit 130 fine-tunes (adjust) the rotor unit 121 to ensure that the motor device 120 operates as expected. In one embodiment, the control circuit 130 stores multiple operating parameters. Each operating parameter is recorded as "when the motor is in a preset position, the on or off state of each switch in the next moment", so that the control signals UH, UL, WH, WL, VH, VL can be generated according to the control circuit 130. Accordingly, it will be confirmed that the rotor unit 121 rotates in an expected manner.

In step S203, the control circuit 130 clocks to obtain a first maintenance time when the polarity data is maintained in the first state. As shown in FIG. 1, multiple switches Q1-Q6 of the driving circuit 110 are turned on or off at different times to change the direction of current flow on the three-phase nodes NU, NV, NW. In other words, switches Q1-Q6 can be controlled in six combinations (i.e., turn on and off according to the control signals UH, UL, WH, WL, VH, VL) to rotate the rotor unit 121. Therefore, whenever the polarity recorded in the polarity data changes (i.e., when it is no longer "0, 0"), it is equivalent to the rotor unit 121 has rotated 60 degrees.

In step S204, the control circuit 130 continuously determine whether the polarity data has changed from the first state to the second state. In step S205, if the control circuit 130 determines that the polarity data has changed to the second state, the control circuit 130 stops clocking (the first maintenance time), and is reclocked to obtain the second maintenance time when the polarity data is maintained in the second state.

In step S206, the control circuit 130 determine whether the second maintenance time corresponds to the first maintenance time. In this embodiment, since the time when the rotor unit 121 is in each state should be the same, the control circuit 130 determines whether the second maintenance time is equal to the first maintenance time.

In some other embodiments, in order to deal with errors or other control requirements (e.g., adjust speed of rotation), the control circuit 130 will determine a relative ratio between the second maintenance time and the first maintenance time. When the relative ratio corresponds to the set ratio, it means that the step S206 is determined as "yes". For example, if the first maintenance time is 1 millisecond and the set ratio is 1.2, then when the second maintenance time is 1.2 milliseconds, the control circuit 130 determines the step S206 is "yes".

Specifically, the set ratio is generated according to a correction value, and the correction value corresponds to a relative position (e.g., coordinate or distance length) between the first sensor H1 and the second sensor H2. For example, measuring the sensing time point of the first sensor H1 and the second sensor H2 respectively, and comparing the sensing time point with an ideal time point. The obtained correction value will represent the position deviation of the first sensor H1 or the second sensor H2. The position deviation is configured to confirm the relative ratio between the second maintenance time and the first maintenance time. In some embodiments, the set ratio can be set to a value between 0.5-1.5.

In step S207, when the second maintenance time corresponds to the first maintenance time (e.g., the length of time is identical, or the relative ratio meets the set ratio), the control circuit 130 sets the polarity data form the second state to the third state. Accordingly, although the polarity (i.e., the polarity data) recorded by the first sensor H1 and the second sensor H2 in the second state and the third state are both "1, 0", the control circuit 130 still determine whether the current position of the rotor unit 121 should be changed to the polarity of the third state by "timing/clocking". The control circuit 130 adjusts the control signals UH, UL, WH, WL, VH, VL according to the newly set third state and the operating parameters corresponding to the third state.

In other words, although the first polarity and the second polarity in the second state and the third state are the same (identical), which are both "1, 0", the control circuit 130 can still determine the time that the rotor unit 121 is in the second state by "timing/clocking". After determining that the rotor unit 121 is in the third state, the control circuit 130 changes to monitor the polarity combination in the polarity data, and maintains the third state until the control circuit 130 is determined that the polarity data has changed from the third state to the fourth state. Accordingly, even if the motor system 100 only has two sensors H1, H2, the current position of the rotor unit 121 can be accurately determined.

Similarly, referring to the foregoing table, when the polarity data is in the fourth state, the control circuit 130 can determine the fourth, fifth, and sixth states of the polarity data in a similar method. In some embodiments, the first state to the third state are used to represent a first half of the rotation period of the rotor unit, and the fourth state to the fifth state are used to represent a second half of the rotation period. Therefore, the first polarity and the second polarity recorded in the fourth state and the first state are opposite. As shown in the foregoing table, the first state is "0, 0", and the fourth state is "1, 1".

Figure 3:
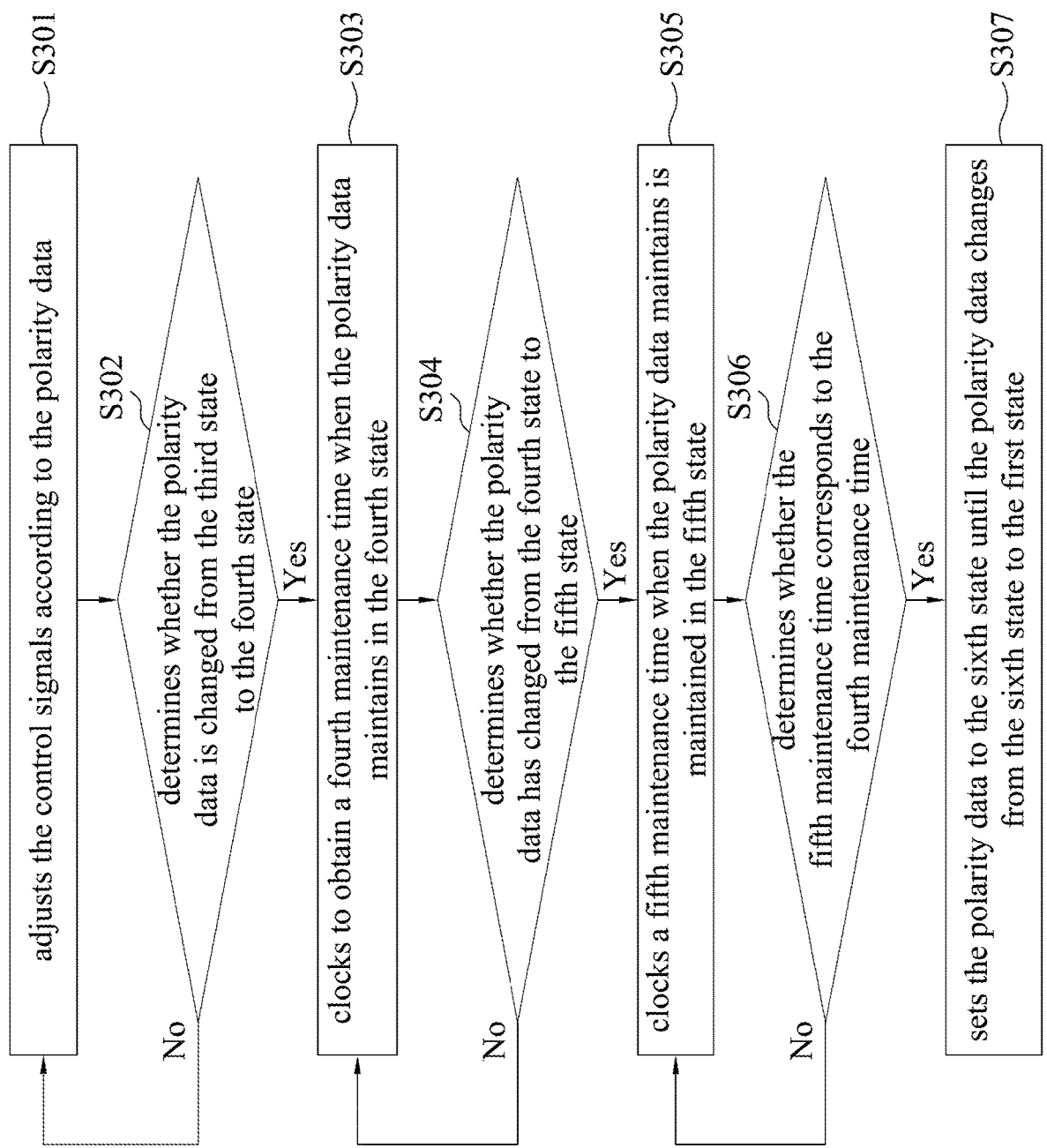
FIG. 3 is a flowchart illustrating a motor control method in some embodiments of the present disclosure.

FIG. 3 is a flowchart illustrating a motor control method in some embodiments of the present disclosure. In step S301, in the third state, the control circuit 130 adjusts the control signals UH, UL, WH, WL, VH, VL according to the polarity data and corresponding operating parameters. In step S302, the control circuit 130 determines whether the polarity data has changed from the third state to the fourth state. In other words, the control circuit 130 determines whether the first polarity or the second polarity in the polarity data has changed. If the first polarity or the second polarity in the polarity data changes, in step S303, the control circuit 130 starts timing/clocking to obtain a fourth maintenance time when the polarity data maintains in the fourth state. The control circuit 130 is changed to adjust the control signals UH, UL, WH, WL, VH, VL according to the fourth state and corresponding operating parameters.

In step S304, the control circuit 130 determines whether the polarity data has changed from the fourth state to the fifth state. If the polarity data is changed from the fourth state to the fifth state, it means the fourth state ends, the control circuit 130 stop timing/clocking by the fourth maintenance time. In step S305, the control circuit 130 is changed to adjust the control signals UH, UL, WH, WL, VH, VL according to the fifth state and corresponding operating parameters. At the same time, the control circuit 130 starts timing/clocking a fifth maintenance time when the polarity data maintains is maintained in the fifth state.

In step S306, the control circuit 130 determines whether the fifth maintenance time corresponds to the fourth maintenance time. Similar to the above step S206, the control circuit 130 can determine whether the fifth maintenance time and the fourth maintenance time are identical, or the control circuit 130 can determine whether the relative ratio between the fifth maintenance time and the fourth maintenance time meets the set ratio.

In step S307, when the fifth maintenance time corresponds to the fourth maintenance time, the control circuit 130 sets the polarity data to the sixth state until the polarity data changes from the sixth state to the first state, which means that the rotor unit 121 completes one rotation cycle.

The above steps S201-S207 and steps S301-S307 correspond to a complete rotation cycle of the motor device 120. In one embodiment, the control circuit 130 recalculates the first maintenance time of the first state and the maintenance time of the fourth state in each cycle. The control circuit 130 determines the maintenance time of the second state/the fifth state through the first maintenance time/the fourth maintenance time. In addition, in the third state and the sixth state, the control circuit 130 does not need to timing/clocking, but monitors the polarity change in the polarity data to confirm whether the rotor unit 121 enters the first state/the fourth state.

Furthermore, in some embodiments, the first sensor H1 and the second sensor H2 are respectively arranged on any two stator windings in the motor device 120, but the present disclosure is not limited to this. In other embodiments, the first sensor H1 and the second sensor H2 can also be arranged at other positions in the motor device 120 to sense the polarity of a specific part or specific direction of the rotor unit 121.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A motor system, comprising:
    a driving circuit comprising a plurality of bridge arm units, wherein the plurality of bridge arm units are electrically coupled to a power source, and control a plurality of switches to be turned on or off according to a plurality of control signals to output a driving current;
    a motor device electrically coupled to the driving circuit to drive a rotor unit to rotate according to the driving current, wherein the motor device comprises a first sensor and a second sensor, and the first sensor and the second sensor are configured to sense a polarity of the rotor unit in different directions to generate a polarity data; and
    a control circuit electrically coupled to the driving circuit and the motor device to receive the polarity data, wherein the control circuit is configured to obtain a first maintenance time that the polarity data is maintained in a first state; and when the polarity data changes from the first state to a second state, and a second maintenance time that the polarity data is maintained in the second state corresponds to the first maintenance time, the control circuit is configured to set the polarity data to a third state until the polarity data is changed from the third state to a fourth state.

2. The motor system of claim 1, wherein the first sensor is configured to sense a first polarity of the rotor unit in a first direction, the second sensor is configured to sense a second polarity of the rotor unit in a second direction, and the first polarity and the second polarity are recorded as the polarity data.

3. The motor system of claim 2, wherein the first polarity and the second polarity recorded in the second state and the third state are identical.

4. The motor system of claim 2, wherein when the polarity data is in the fourth state, the control circuit is configured to record a fourth maintenance time of the fourth state, and the first polarity and the second polarity recorded in the fourth state and the first state are opposite.

5. The motor system of claim 1, wherein the control circuit is configured to determine a relative ratio between the second maintenance time and the first maintenance time, and when the relative ratio corresponds to a set ratio, the control circuit sets the polarity data to the third state.

6. The motor system of claim 5, wherein the set ratio is generated according to a correction value, and the correction value corresponds to a relative position between the first sensor and the second sensor.

7. The motor system of claim 1, wherein the control circuit is configured to generate the plurality of control signals according to the polarity data, and the plurality of control signals are pulse width modulation signals.

8. The motor system of claim 7, wherein after the motor device is activated and the control circuit determines that the polarity data is in the first state, the control circuit generates the plurality of control signals according to the polarity data, and transmits the plurality of control signals to the driving circuit.

9. The motor system of claim 1, wherein the control circuit is configured to record a fourth maintenance time of the fourth state, when the polarity data changes from the fourth state to a fifth state, and a fifth maintenance time of the fifth state corresponds to the fourth maintenance time, the control circuit is configured to set the polarity data to a sixth state until the polarity data is changed from the sixth state to the first state.

10. The motor system of claim 1, wherein an arrangement angle between the first sensor and the second sensor is at least 120 degrees.

11. A motor control method, comprising:
    obtaining, by a first sensor and a second sensor, a polarity of a rotor unit of a motor device in different directions to generate a polarity data;
    recording, by a control circuit, a first maintenance time that the polarity data is maintained in a first state;
    when the polarity data changes from the first state to a second state, recording a second maintenance time until the second maintenance time of the second state corresponds to the first maintenance time;
    when the second maintenance time that the polarity data is maintained in the second state corresponds to the first maintenance time, setting the polarity data to a third state until the polarity data is changed from the third state to a fourth state; and
    generating a driving current according to the polarity data to drive the motor device.

12. The motor control method of claim 11, wherein obtaining the polarity of the rotor unit of the motor device in the different directions to generate the polarity data comprises:
    sensing, by the first sensor, a first polarity of the rotor unit in a first direction; and
    sensing, by the second sensor, a second polarity of the rotor unit in a second direction, wherein the first polarity and the second polarity are recorded as the polarity data.

13. The motor control method of claim 12, wherein the first polarity and the second polarity recorded in the second state and the third state are identical.

14. The motor control method of claim 12, further comprising:
    when the polarity data is in the fourth state, recording a fourth maintenance time of the fourth state, wherein the first polarity and the second polarity recorded in the fourth state and the first state are opposite.

15. The motor control method of claim 11, wherein setting the polarity data to the third state comprises:
    determining a relative ratio between the second maintenance time and the first maintenance time; and
    setting the polarity data to the third state when the relative ratio corresponds to a set ratio.

16. The motor control method of claim 15, wherein the set ratio is generated according to a correction value, and the correction value corresponds to a relative position between the first sensor and the second sensor.

17. The motor control method of claim 11, wherein generating the driving current according to the polarity data to drive the motor device comprises:
    generating a plurality of control signals according to the polarity data to control a plurality of switches of a driving circuit to be turned on or off according to the plurality of control signals, wherein the plurality of control signals are pulse width modulation signals.

18. The motor control method of claim 17, wherein generating the driving current according to the polarity data to drive the motor device further comprises:
    determining whether that the polarity data is in the first state when the motor device is activated; and
    when the polarity data is in the first state, generating the plurality of control signals according to the polarity data.

19. The motor control method of claim 11, further comprising:
    recording a fourth maintenance time of the fourth state; and
    when the polarity data changes from the fourth state to a fifth state, and a fifth maintenance time of the fifth state corresponds to the fourth maintenance time, setting the polarity data to a sixth state until the polarity data is changed from the sixth state to the first state.

20. The motor control method of claim 11, wherein an arrangement angle between the first sensor and the second sensor is at least 120 degrees.

\* \* \* \* \*